(12) United States Patent
Batten

(10) Patent No.: US 6,368,501 B1
(45) Date of Patent: Apr. 9, 2002

(54) APPLIANCE DRAIN ASSEMBLY

(75) Inventor: William C. Batten, Asheboro, NC (US)

(73) Assignee: Clearline Systems, Inc., Asheboro, NC (US)

( * ) Notice: Subject to any disclaimer, the term of this patent is extended or adjusted under 35 U.S.C. 154(b) by 0 days.

(21) Appl. No.: 09/933,565

(22) Filed: Aug. 20, 2001

Related U.S. Application Data

(63) Continuation-in-part of application No. 09/483,401, filed on Jan. 14, 2000, now Pat. No. 6,328,901, which is a continuation-in-part of application No. 08/969,207, filed on Nov. 13, 1997, now Pat. No. 6,019,894.

(51) Int. Cl.[7] .......................... C02F 1/40; B01D 17/032
(52) U.S. Cl. .................... 210/181; 210/248; 210/416.1; 210/538; 210/238; 210/540
(58) Field of Search ................................ 210/181, 232, 210/248, 416.1, 513, 538, 238, 540

(56) References Cited

U.S. PATENT DOCUMENTS

| | | | | |
|---|---|---|---|---|
| 1,851,172 A | * | 3/1932 | Gordon | |
| 2,463,814 A | * | 3/1949 | Skinner | |
| 4,506,598 A | * | 3/1985 | Meister | |
| 5,178,754 A | * | 1/1993 | Batten et al. | |
| 5,202,019 A | * | 4/1993 | Skogland | |
| 5,597,493 A | * | 1/1997 | Torini | |
| 5,649,528 A | * | 7/1997 | Oslin et al. | |
| 6,019,894 A | * | 2/2000 | Batten | |
| 6,162,354 A | * | 12/2000 | Yang et al. | |
| 6,328,901 B1 | * | 12/2001 | Batten | |

* cited by examiner

Primary Examiner—Duane Smith
Assistant Examiner—Fred Prince
(74) Attorney, Agent, or Firm—MacCord Mason PLLC

(57) ABSTRACT

An assembly for connection to the drain of a cooking appliance which diverts low volume flow effluent from the drain is disclosed. The assembly includes a pipe defining a main flow channel. An auxiliary exit port is connected to the pipe in such a way that the low volume flow will be diverted from the pipe into the auxiliary exit port. A hot water entry pipe port is also connected to the pipe and is in connection with a hot water source which provides a flow of hot water into the pipe. Additionally, a solenoid valve regulates the flow of hot water into the pipe.

11 Claims, 7 Drawing Sheets

APPLIANCE DRAIN ASSEMBLY

This application is a continuation-in-part of application Ser. 09/483,401 filed Jan. 14, 2000, which is a now U.S. Pat. No. 6,328,901 continuation-in-part of copending application Ser. No. 08/969,207 filed Nov. 13, 1997, (now U.S. Pat. No. 6,019,894) the entire disclosure of which is hereby incorporated by reference.

The present invention relates generally to a drain assembly for a cooking appliance and, more particularly, to a drain assembly for diverting cooking effluent into a grease/water separator. The drain assembly can be downstream of the cooking appliance by a considerable amount, including outside of the building in which the cooking appliance is located. Also, the drain assembly can receive flows other than from a cooking appliance, including flows from other kitchen sources such as warewashing sinks.

BACKGROUND OF THE INVENTION

A combination oven uses both steam and radiant heat in the cooking process. Typically, these ovens use a steam kettle to generate steam for the cooking chamber. The steam kettle must be periodically flushed to remove any limes, scales, or precipitate from the steam kettle. The flush cycle completely purges the water in the kettle by means of an internal pump or line pressure arrangement. This flush sequence can propel twenty to twenty-five liters of water through the kettle and into the combination oven. The flush water exits a discharge port in the oven in a short (30 to 60 second) time frame. These ovens typically use a condensate discharge pipe with an outer diameter of 50 millimeters. Therefore, the entire pipe cross section must be available to allow for such a high volume of water to be discharged in that time.

However, during the cooking process, condensed steam and grease exit the cooking area of the oven through the same discharge port in the oven as the flush water flow. This flow of condensed steam and grease exits at a much lower flow rate. It typically has been directed through the same drain line with its eventual discharge into a sewage outlet. In many applications, the grease tends to solidify within the drain pipe. Once that blockage occurs, the large flow of flush water cannot escape the drain pipe at a proper rate of speed. This backup may cause water to pool in the bottom of the appliance or leak out of the appliance through areas other than the drain. This backup may also cause contamination of the cooking racks and/or the food products placed on the cooking racks. Thus, there is a need to ensure that the drain pipe remains clear from any grease or other residue.

Further, the clogging of the drain pipe by the condensate from the cooking appliance causes drainage problems with other appliances connected to the drain pipe. Thus, there is a need to separate components of the condensate flow which could cause an obstruction within the drain pipe. In that regard, there is a need to divert the condensate to a grease/water separator or other pollution control device so that those components can be separated from the condensate stream thereby allowing a flow that is predominantly water to be discharged into the building's drain system.

SUMMARY OF THE INVENTION

The present invention is directed to a drain assembly to be attached between the discharge port of a cooking appliance and the drain line for a building. The cooking appliance may be a combination oven. The drain assembly is designed so that low volume effluent will be diverted from the main flow channel of the assembly so that periodic high volume flows may flow unobstructed through the assembly.

Accordingly, one aspect of the invention is to provide an accumulator on a pipe. The pipe defines the main flow channel. The accumulator provides a path to which the low volume flow can be gravitationally diverted. The low volume flow will then be discharged through an exit port in the accumulator.

Another aspect of the invention is to reduce the likelihood that components of the low volume flow will obstruct the main flow channel. Thus, a heat source is located in proximity to the accumulator. The heat source is sufficient to melt any meltable components of that low volume flow, such as cooking grease.

The assembly of a first embodiment is typically cylindrical with an outer diameter of about 50 millimeters. The assembly is preferably made with 16 gauge bright finish stainless steel.

In an embodiment of the invention, the accumulator is attached to the pipe so that the accumulator spans across the lowest arc segment of the pipe. The accumulator may also be substantially cylindrical with its cross section having a diameter of about one inch. The accumulator preferably extends from the pipe for a depth of approximately 0.20 inches.

In order to ensure that all of the low volume flow is diverted, the accumulator of this embodiment is preferably has two extensions extending from its upper surface upward along opposite sides of the pipe. The width of the extensions may taper as they extend along the pipe. The exit port may be a circular hole with a diameter of about 0.75 inches centered in the lower end of the accumulator.

The second embodiment has a housing into which the main flow channel enters. The drain pipe discharges into the housing. Inside the housing, the lower periphery of the drain pipe is open and replaced with a strainer assembly. The drain pipe may also be terminated in the strainer assembly. The strainer assembly is typically U-shaped. The drain pipe begins again on a downstream end of the strainer assembly. The strainer conveyor assembly is perforated to allow liquid to be gravitationally diverted into the sump. The strainer assembly provides a sufficient bridge between the inlet and outlet to allow the passage of a high volume flow without substantial diversion of liquid into a sump located at the bottom of the housing. The strainer conveyor may be removable, with the provision of a handle. The sump has a suction line for transport of the diverted liquid to a grease-water separator. As with other embodiments, a heat source can be located near the strainer assembly in order to keep the perforations clear of congealed grease which could form an obstruction. In this embodiment, the heat source maintains the diverted liquid in a flowable state. Additionally, after removal of the grease, the diverted liquid can be returned into the housing to flow to the outlet.

The low volume flow may be conducted from accumulator into a grease/water separator such as a Big Dipper® oil/water separator marketed by Thermaco, Inc., of Asheboro, N.C. It may be preferable to conduct the low volume flow from the accumulator to the grease/water separator using a suction pump.

Understanding that the purpose of the assembly is to maintain the main flow channel free from obstruction, such as cooking grease, in another aspect the invention maintains a heat source within close proximity to the assembly. The heat source keeps the components of the low volume flow above their respective melting points thus preventing coagulation of solids within the main flow channel.

In a preferred embodiment, the heat is provided by hot water flowing into the assembly. The hot water enters the assembly through an entry port which is upstream of the auxiliary exit port. The flow of hot water may be regulated by a solenoid valve. The heat source may also be an electrical heater.

In the process of the invention, the cooking appliance is periodically purged with a high volume flow of water to clear residue. This flow of water is drained through a drain assembly connected to the cooking appliance. Between the purgings, effluent from the cooking appliance drains into the drain assembly and then, within the drain assembly, is diverted from the main flow path used by the high volume flow.

In a preferred embodiment of this process, the drain assembly is heated. The heat will maintain the cooking effluent in a liquid state so that it will flow and not obstruct the main flow path of the drain assembly. The heat is preferably provided by flowing hot water into the drain assembly. The flow of hot water may be regulated by a solenoid valve, or other suitable means, before it is introduced into the drain assembly, It is preferable to divert the cooking effluent into an accumulator attached to the drain assembly. Subsequently, the effluent may be conducted into a grease/water separator in order for the grease and water components of that effluent to be properly disposed of. The effluent can be conducted to such a grease/water separator by using a suction pump in connection with the accumulator.

It should be understood that the apparatus, and the associated process, can be used with cooking appliances other than combination ovens, such as rotisserie ovens and the like.

These and other aspects of the present invention will become apparent to those skilled in the art after reading the following description of the preferred embodiment when considered with the drawings.

DESCRIPTION OF THE PREFERRED EMBODIMENTS

Figure 1:
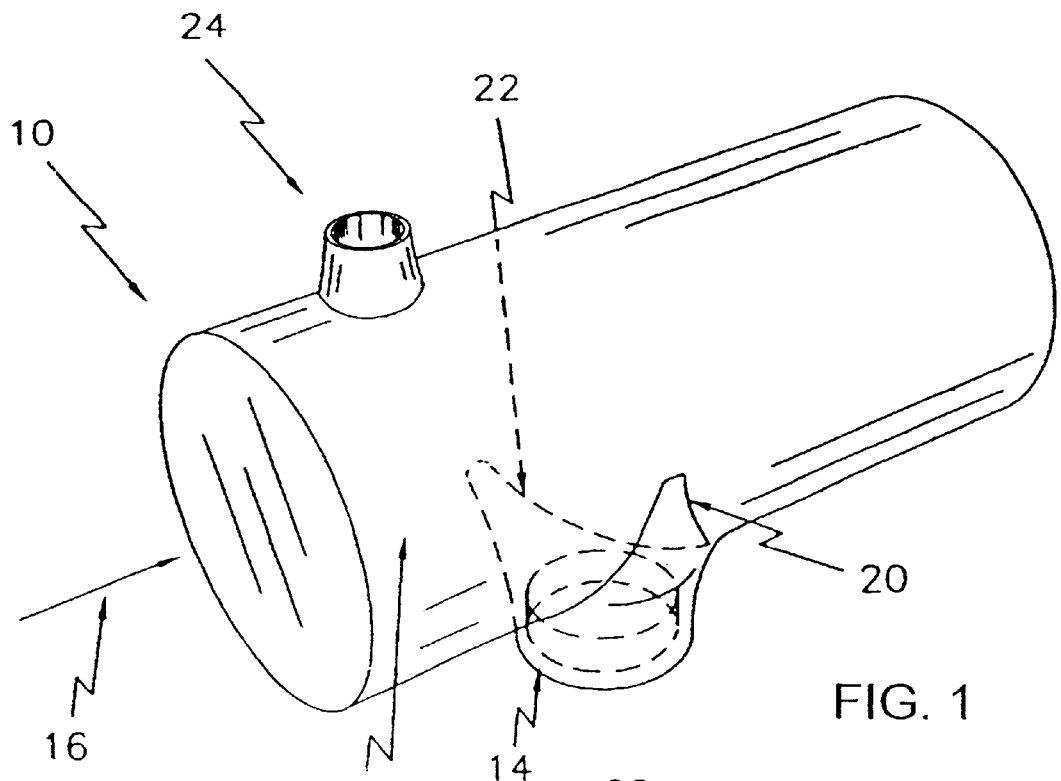
FIG. 1 is a perspective view illustrating a first embodiment of the drain assembly according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

It will be understood that the illustrations are for the purpose of describing a preferred embodiment of the invention and are not intended to limit the invention thereto.

As best seen in FIG. 1, a drain assembly, generally designated number 10, is shown constructed in accordance with the present invention. The drain assembly 10 is primarily constructed of a pipe 12 which defines a main flow channel 16. The main flow channel has a diameter sufficient to accommodate periodic purgings of a cooking appliance. An accumulator 14 spans across the lowest arc segment of the pipe 12. The accumulator 14 has a first extension 20 and a second extension 22 extending upward along opposite sides of the pipe 12 and tapering in width as each one extends upwardly. The extensions 20 and 22 are connected to the accumulator 14 and are designed to divert a low volume flow in the pipe 12 into the accumulator 14. Thus the entire volume of the low volume flow is highly likely to be diverted to the accumulator 14 by the force of gravity since the accumulator 14 provides a drop off to a lower level along the lowest arc segment. The extensions 20 and 22 of the accumulator 14 may be made by outward embossment of the wall of pipe 12. Alternatively, they may be preformed and attached, as by welding to cover a cut-out in the wall of pipe 12. Other suitable fabrication techniques may also be used.

In a preferred embodiment of the invention, a heat source is located proximate to the drain assembly 10. As can be seen in FIG. 1, a hot water entry port 24 is connected to the pipe 12. The hot water entry port 24 is located on the pipe 12 in a manner so that hot water can flow into the pipe 12 to maintain the low volume flow in a liquid state and prevent components of the low volume flow from blocking the main flow channel 16 and the accumulator 14. The hot water entry port 24 is preferably located generally upstream of, and generally above, the accumulator 14.

As can be seen in FIG. 1, the pipe 12 generally has a cylindrical body, preferably constructed of 16-gauge stainless steel.

Figure 2:
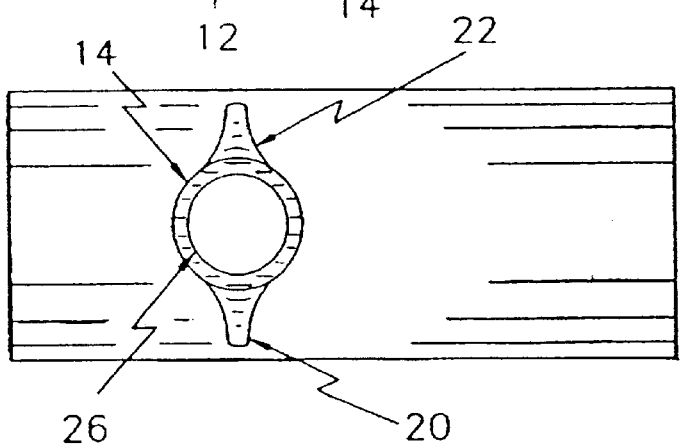
FIG. 2 is a bottom plan view of the drain assembly shown in FIG. 1.
Figure 3:
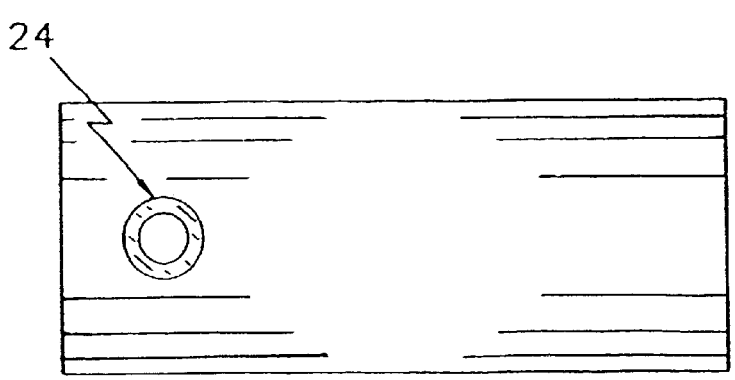
FIG. 3 is a top plan view of the drain assembly shown in FIG. 1.

As can be seen in FIG. 2, the accumulator 14 is generally cylindrical and has an exit port 26 located within it.

Figure 4:
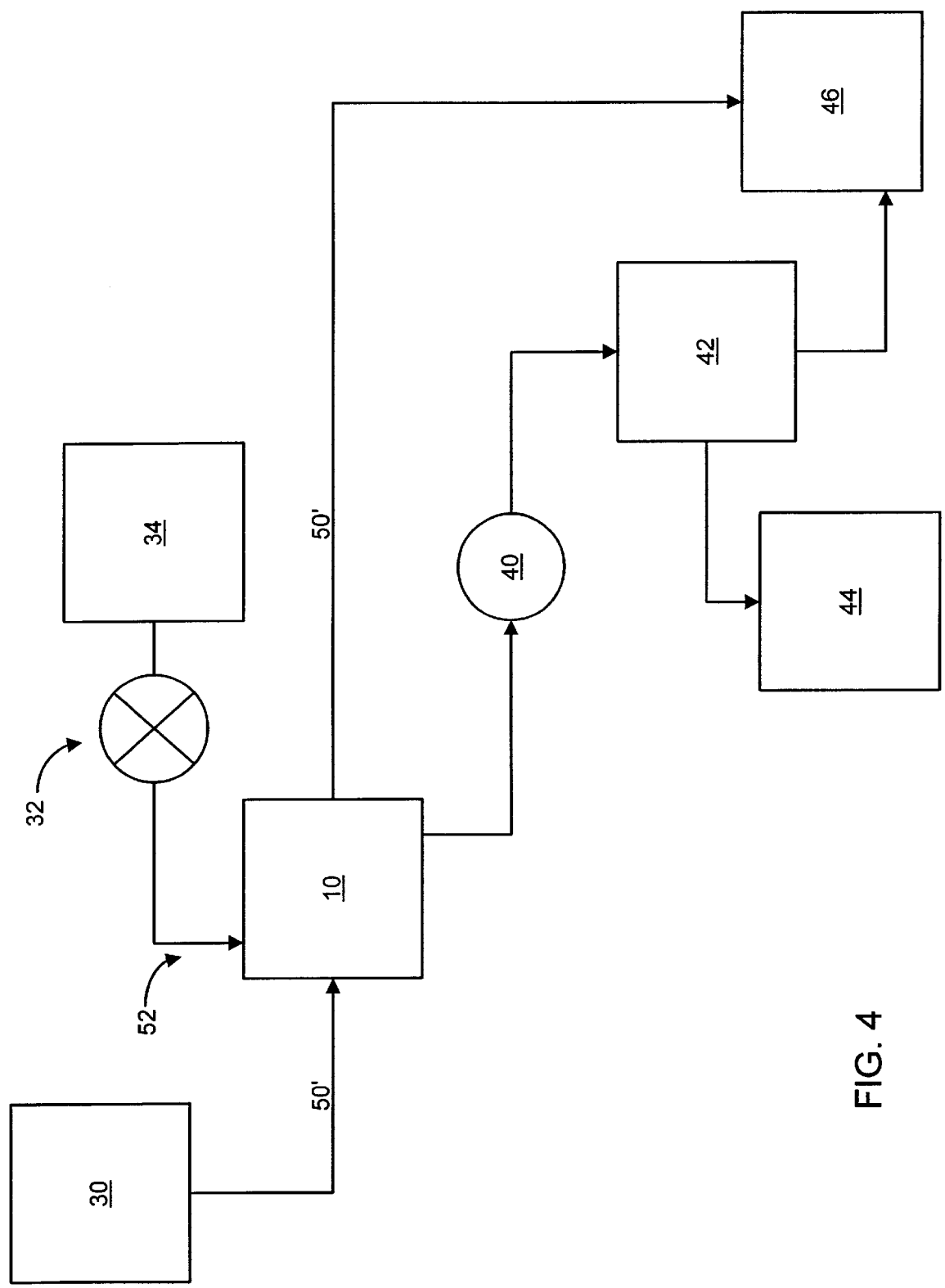
FIG. 4 is a schematic representation of the drain assembly in a kitchen setting according to the invention.

A schematic representation of a typical drain assembly in a kitchen setting can be seen in FIG. 4. The cooking appliance 30 is connected via a discharge pipe 50 to the drain assembly 10. The main flow path of the drain assembly 10 exits through a second discharge pipe 50 into the building drain 46. A suction pump 40 is connected to the exit port 26 of the accumulator 14 in a path divergent from the main flow channel of the drain assembly 10. The suction pump 40 pumps the effluent into a grease/water separator 42. Grease components 44 can be separated and removed, while a flow of water and other components less grease can pass to the building drain 46. Alternatively, the water can be returned to the line 50', as in the scheme of FIG. 9, described below. A hot water source 34 (such as the building's hot water supply) is connected to the drain assembly 10 through a conduit 52. The flow of hot water through the conduit 52 may be regulated by a solenoid valve 32. Value 32 may be opened periodically by controls provided on the cooking appliance 30, or separate controls.

In operation, the system begins when a cooking appliance 30 is activated to begin the cooking process. Typically, a combination oven utilizes a steam kettle that has a flush cycle in the beginning of that cooking process. Of course, the flush cycle could take place after the cooking cycle. The flush cycle completely changes the water in the steam kettle by means of an internal pump or line pressure arrangement. This flush sequence generates a high volume of water which is flushed through the cooking appliance and out the oven condensate discharge port into a discharge pipe 50 in a short time frame. This high volume flush flow usually requires the entire pipe cross section of the discharge pipe 50 be open to allow the expeditious flow out of the combination oven 30. As can be seen in FIG. 4, this high volume flush flow will enter the drain assembly 10 and exit through second discharge pipe 50 without being diverted. The flush flow will enter the building drain 46 unimpeded. The flush flow is high volume, but only for a brief period of time.

During the cooking cycle, the cooking appliance 30 dispenses steam into its cooking cabinet (not shown) to cook the food. Any fats, grease, or other material drains to the bottom of the cooking cabinet with condensate from the steam. This makes a low volume effluent of condensate and cooking residue that exits the cooking appliance 30 through the discharge pipe 50 and enters the drain assembly 10. This low volume flow is gravitationally diverted into the accumulator 14 in the drain assembly. This flow is then suctioned by a pump 40 into a grease/water separator 42. The grease/water separator 42 separates the grease components 44 for proper handling, and allows the rest of the flow to be sent to the building drain 46. As can be seen in FIG. 4, to prevent the drain assembly 10 from being blocked, a hot water source 34 is connected to the drain assembly 10 to allow for hot water to flow through a conduit 52 into the drain assembly 10 and maintain the low volume flow in a liquid state. A valve 32 regulates the hot water flow and is typically activated at the same time that the cooking cycle is begun.

Figure 5:
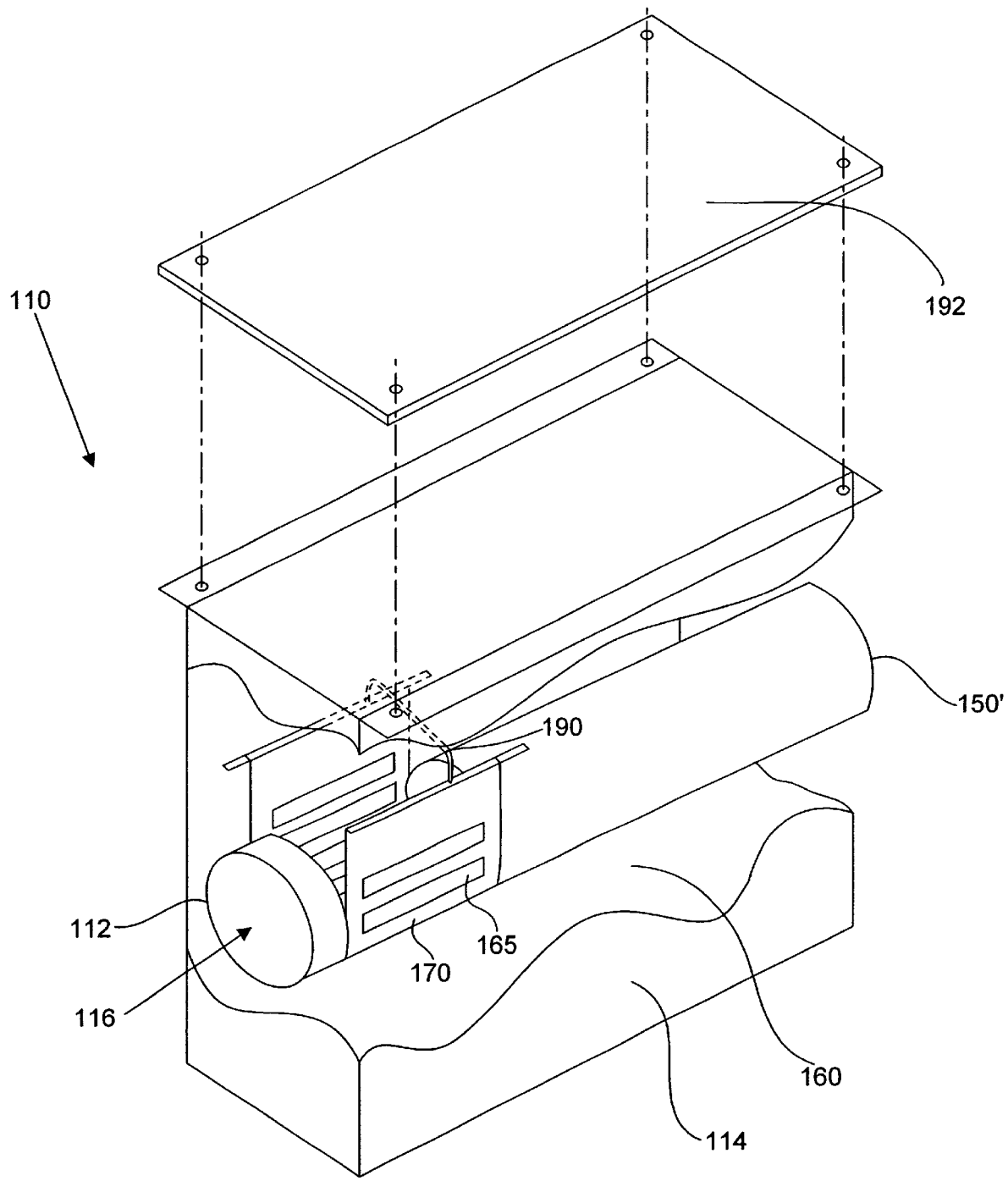
FIG. 5 is a perspective exploded view illustrating a second embodiment of the drain assembly according to the invention.

In a second embodiment as shown in FIG. 5, the drain assembly 110 surrounds a pipe 112 and the main flow channel 116. The downstream end of the pipe is the second discharge pipe 150'. A housing 114 defines a reservoir or sump 160 underneath the main flow channel 116. The housing has an access lid 192. A strainer 165 replaces the bottom periphery of the pipe 112 within the confines of the housing 114. In this embodiment, the strainer 165 is U-shaped and has a multiplicity of perforations 170. In operation, a low volume flow in the main flow channel 116 will be diverted through the perforations and into the sump 160. The perforations are shown as slots, but any size or shape permitting low volume flows to pass to the sump while diverting high volume flows to the outlet may be used.

Figure 6:
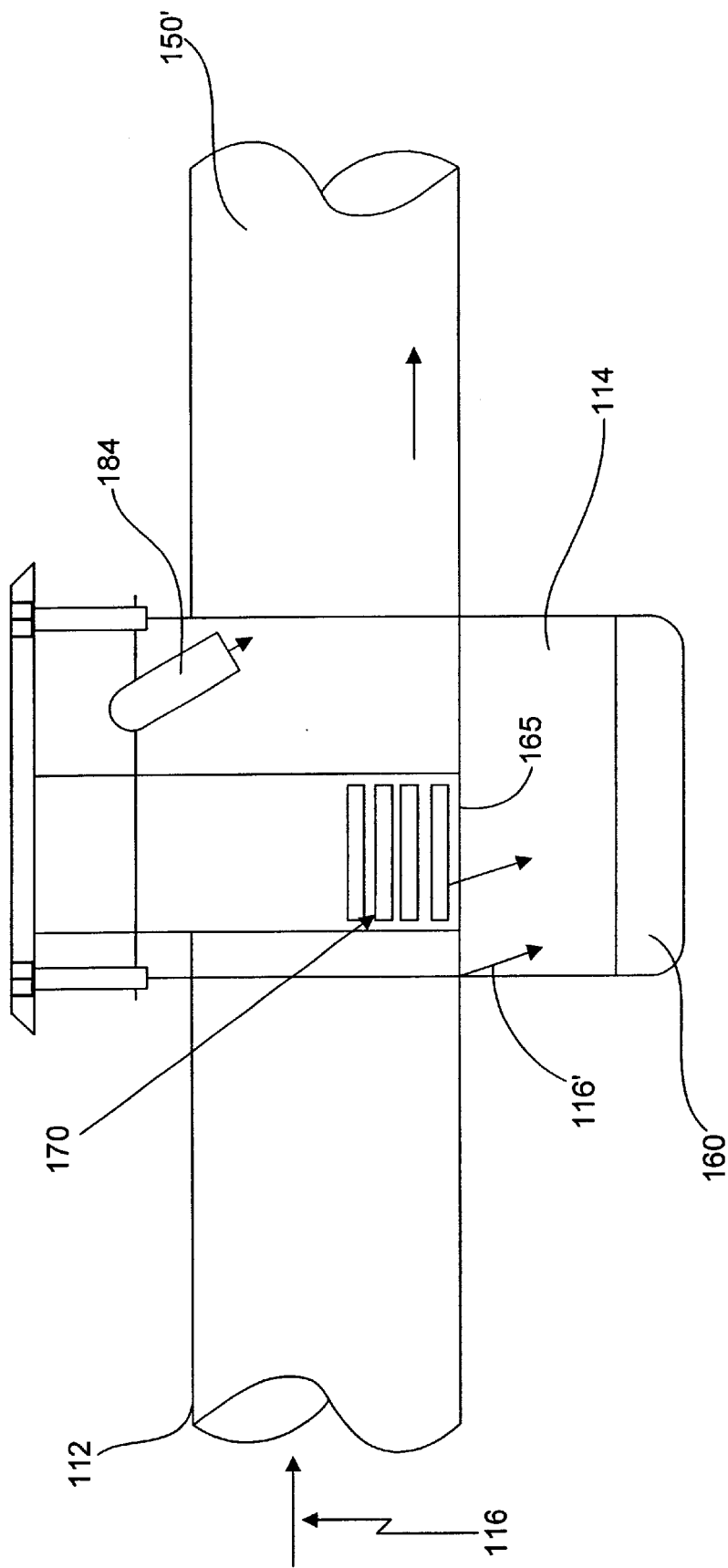
FIG. 6 is a side sectional view of the drain assembly shown in FIG. 5.

FIG. 6 shows how the apparatus diverts the low volume flow. A low volume flow enters the main flow channel 116. The strainer 165 allows the low volume flow to pass through perforations 165. The low volume flow, indicated generally by direction 116', is diverted into the sump 160. Once the accumulated liquid is separated in a grease/water separator, the water components may be returned to the discharge line 150' through return line 184. Return line 184 enters the pipe 112 downstream of the strainer 165 and carries the returned liquid to the building drain.

Figure 7:
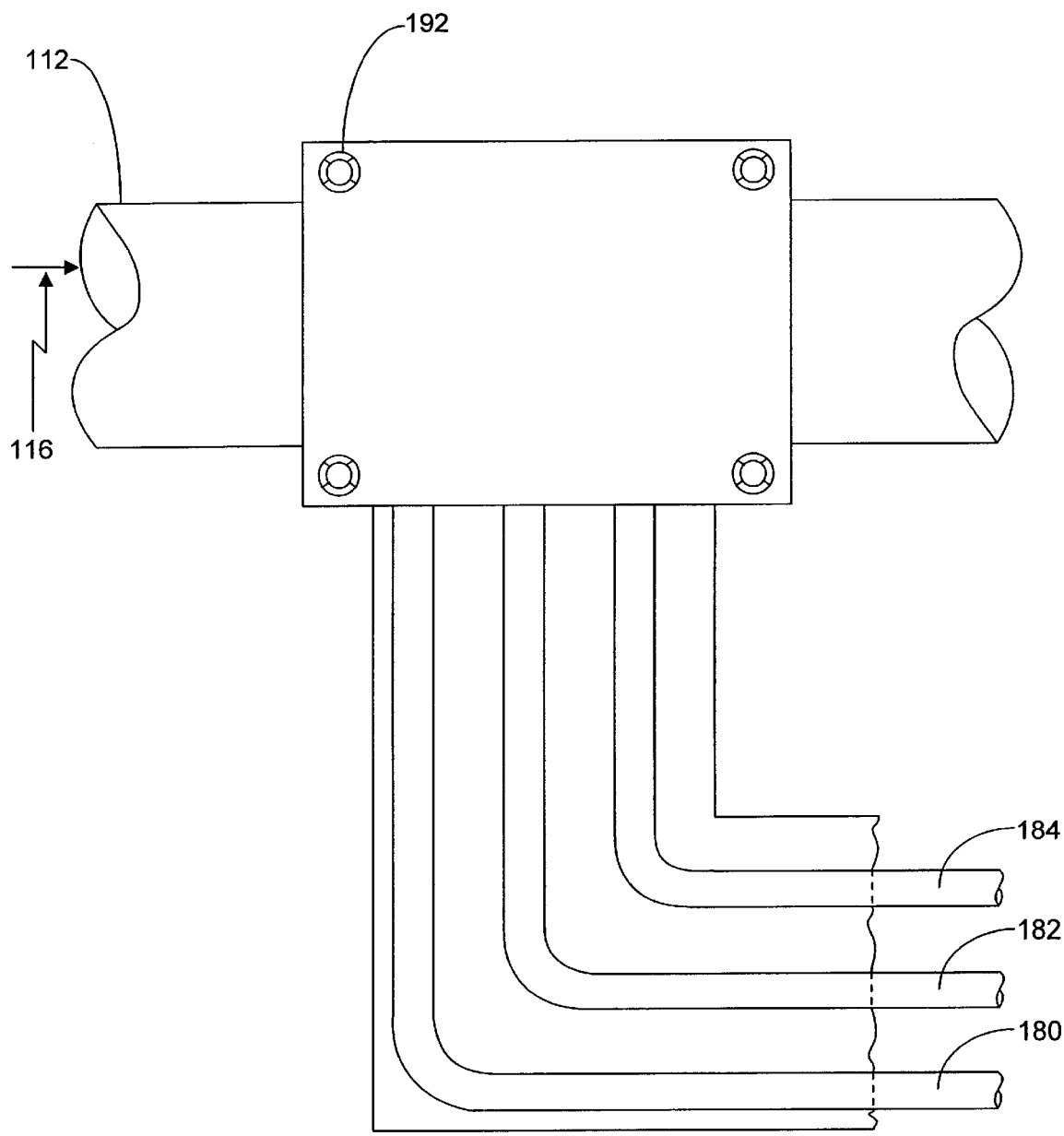
FIG. 7 is a top plan view of the drain assembly shown in FIG. 5.

FIG. 7 shows that the housing 114 can be provided with a suction line 180 to remove liquid from the sump 160, and shows the hot water line 182, and a return line 184.

Figure 8:
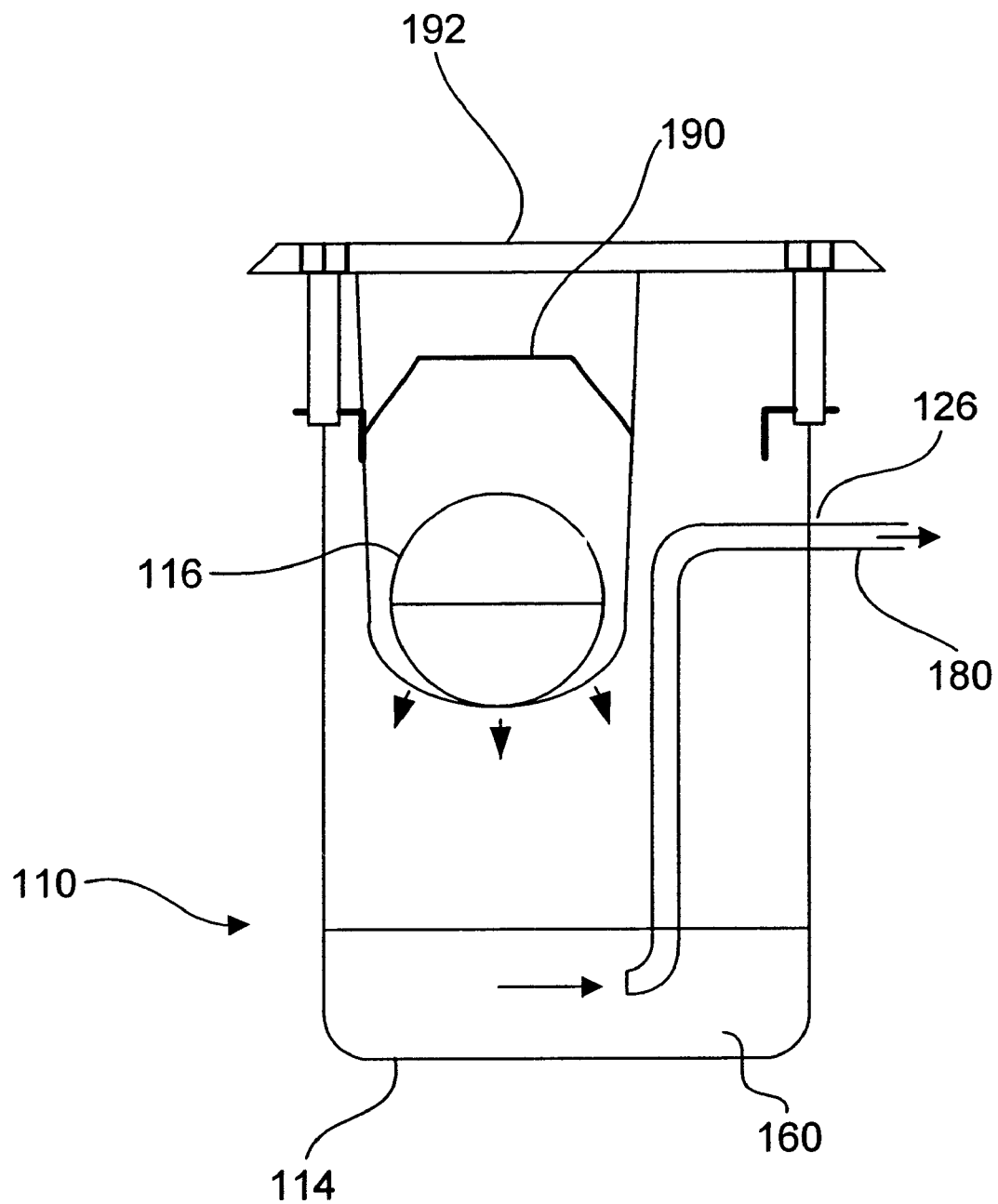
FIG. 8 is an end sectional view of the drain assembly shown in FIG. 6.
Figure 9:
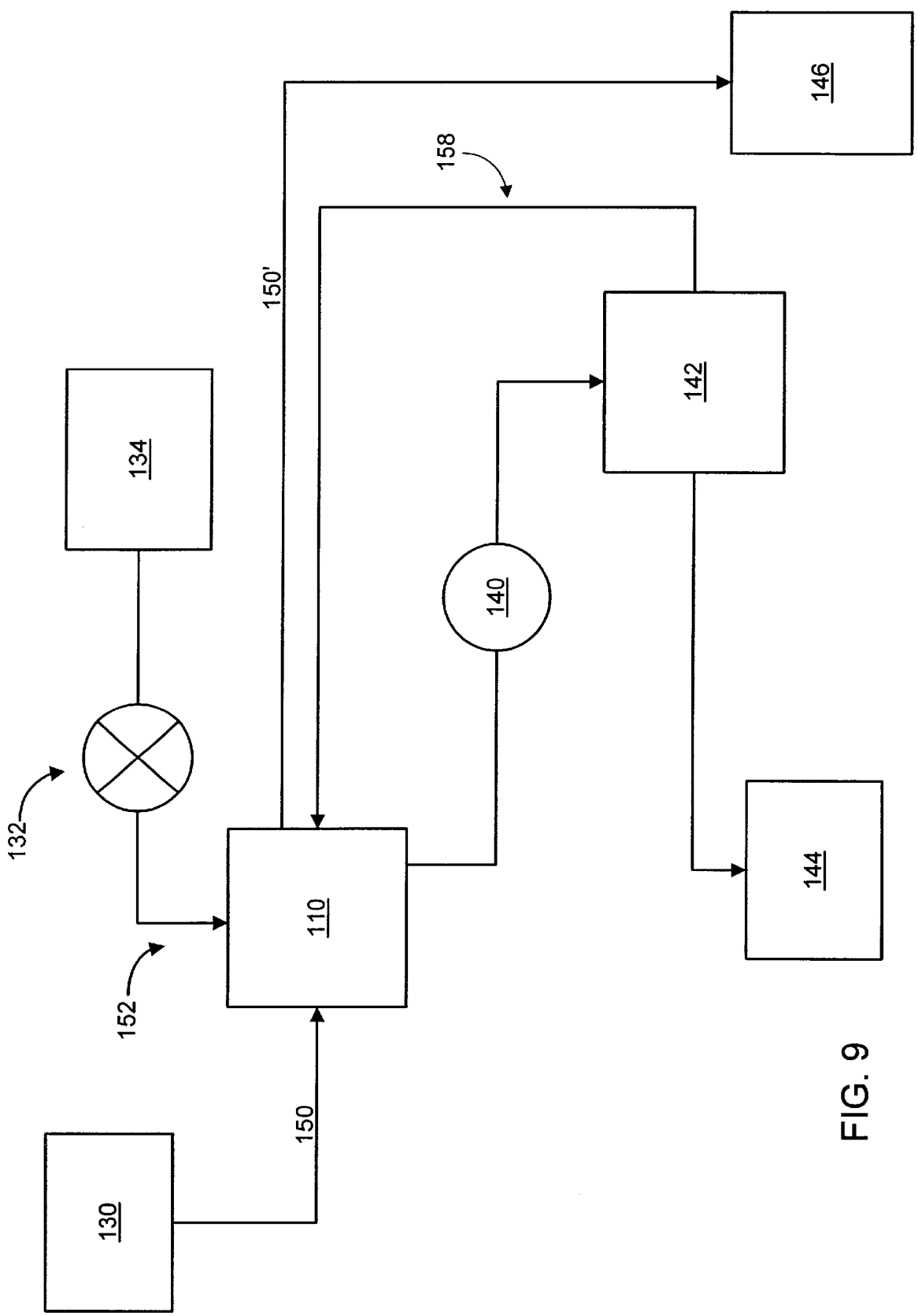
FIG. 9 is a schematic representation of the drain assembly in another kitchen setting according to the invention.

As seen in FIG. 8, the lid 192 and strainer 165 can be removable and may have a handle 190 provided to permit easy removal. This design permits easy servicing. Accumulated liquid in the sump 160 will be removed through an exit port 126. A suction line 180 enters through the exit port 126 and extends into the reservoir 160 so as to be able to conduct the accumulated liquid. The suction line 180 may convey the accumulated liquid to a grease/water separator, not shown in FIG. 8. The liquid in line 180 may be pumped by a pump like pump 140 to a grease/water separator 142 as shown in FIG. 9. The water from the separator may be directed to the building drain as in FIG. 4.

FIG. 9 is a schematic representation of the drain assembly 110 in a second kitchen setting. The cooking appliance 130 is connected via a discharge pipe 150 to the building drain 46. A suction pump 140 is connected to the exit port 126 of the drain assembly 110 and pumps the effluent into a grease/water separator 142. Grease components can be separated and removed, while a flow of water and other components less grease can be returned to the discharge pipe 150' in a location downstream from the strainer 165. A hot water source 134 is connected to the housing 110 through a conduit 152. The flow of hot water through the conduit 152 may be regulated by a solenoid valve 132. Solenoid valve 132 may be opened periodically by controls provided on the cooking appliance 130, or separate controls.

In operation, the system begins when a cooking appliance 130 is activated to begin the cooking process. Typically, a combination oven utilizes a steam kettle that has a flush cycle in the beginning of that cooking process. Of course, the flush cycle could take place after the cooking cycle. The flush sequence generates a high volume of water which is flushed to the cooking appliance and out a discharge port into a discharge pipe 150 in a short time frame. This high volume flush flow usually requires entire pipe cross section of the discharge pipe 150 to be open to allow flow out of the cooking appliance 130. As can be seen in FIG. 9, this high volume flush flow will enter the housing 110 and exit through second discharge pipe 150' without being substantially diverted. This flush flow will enter the building drain 46 unimpeded.

During the cooking cycle, the cooking appliance 130 dispenses steam into its cooking cabinet (not shown). Any fats, grease, or other materials drain to the bottom of the cooking cabinet with condensate from the steam. This makes a low volume effluent of condensate and cooking residue that exits the cooking appliance 130 through the discharge pipe 150 and enters the housing 110. This low volume flow is gravitationally diverted into the sump 160 through the perforations 170 of the strainer 165. This flow may then be suctioned by a pump 140 into a grease/water separator 42. The grease/water separator 42 separates the grease components 44 for proper handling, and allows the rest of the flow to be sent back to the downstream side of the strainer 165 where it enters the discharge pipe 150' eventually to be sent to the building drain 46. To prevent the strainer 165 from being blocked, a hot water source 134 is connected to the housing 110 to allow for hot water to flow through a conduit 152 into the strainer 165 and maintain the low volume flow in a liquid state in the sump 160. A valve 132 may regulate the hot water flow and is typically activated at the same time as the cooking cycle is begun.

Certain modifications and improvements will occur to those skilled in the art upon a reading of the foregoing description. It should be understood that all such modifications and improvements have been deleted herein for the sake of conciseness and readability but are properly within the scope of the following claims:

What is claimed is:

1. An assembly for connection to a drain, said assembly comprising:

(a) a housing having a sump, an accumulator inlet and an accumulator outlet wherein said sump is below said inlet and said outlet, (b) a main flow inlet channel connected to said accumulator inlet, (c) a main flow outlet channel connected to said accumulator outlet, (d) a strainer connecting said main flow inlet with said main flow outlet, said strainer having a lower peripheral surface, and (e) perforations in said lower peripheral surface to allow a substantial amount of a low volume flow from said main flow inlet channel to be gravitationally diverted into said sump prior to entering said main flow outlet channel.

2. The assembly of claim 1 further comprising a heat source located proximate said housing to melt a meltable component of said low volume flow and prevent obstruction within said strainer.

3. The assembly of claim 1 further comprising a suction line having a first and a second end, said first end extending to the sump.

4. The assembly of claim 3 further comprising a grease/water separator connected to said suction line second end to separate grease and water components of contents of said sump.

5. The assembly of claim 4 wherein said grease/water separator has a grease outlet and a water outlet, further comprising a return line connecting said water outlet of said grease/water separator with said main flow outlet channel of said accumulator.

6. The assembly of claim 1 wherein the housing has a removable lid.

7. The assembly of claim 6 wherein the strainer is removable once the lid is removed.

8. The assembly of claim 7 wherein the strainer has a handle.

9. The assembly of claim 7 wherein said strainer is removably connected to said upstream drain pipe and said downstream drain pipe.

10. An assembly for connection to a drain, said assembly comprising:

(a) a housing having a sump, an accumulator inlet and an accumulator outlet wherein said sump is below said inlet and said outlet, and the housing has a removable lid, (b) a main flow inlet channel connected to-aid accumulator inlet, (c) a main flow outlet channel connected to said accumulator outlet, (d) a removable strainer connecting said main flow inlet with said main flow outlet, said strainer having a lower peripheral surface, and a handle, (e) perforations in said lower peripheral surface to allow a low volume flow from said main flow inlet channel to be gravitationally diverted prior to entering said main flow outlet channel, (f) a heat source located proximate said strainer conveyor to melt a meltable component of said low volume flow to prevent obstruction within said strainer, (g) a suction line having a first and a second end, said first end extending into the sump and said second end connected to a grease/water separator to separate grease and water components of the contents of the sump, wherein said grease/water separator has a grease outlet and a water outlet, and (h) a return line connecting said water outlet of said grease/water separator with said main flow outlet channel of said accumulator.

11. An assembly for connection to a drain, said assembly comprising:

(a) an upstream drain pipe (b) a downstream drain pipe (c) a housing having an inlet, an outlet and a sump below said inlet and said outlet, said upstream drain pipe extending to said inlet and said downstream drain pipe extending from said outlet, and (d) a strainer connecting said upstream drain pipe and said downstream drain pipe, said strainer having perforations in a lower surface to allow a low volume flow from said upstream drain pipe to be gravitationally diverted through said perforations into said sump.

* * * * *